(12) United States Patent
Urbach et al.

(10) Patent No.: US 9,609,284 B2
(45) Date of Patent: Mar. 28, 2017

(54) PORTABLE MOBILE LIGHT STAGE

(71) Applicants: Julian Michael Urbach, Sherman Oaks, CA (US); Malcolm Taylor, Los Angeles, CA (US); Clay Sparks, Los Angeles, CA (US); Timothy Hawkins, Los Angeles, CA (US)

(72) Inventors: Julian Michael Urbach, Sherman Oaks, CA (US); Malcolm Taylor, Los Angeles, CA (US); Clay Sparks, Los Angeles, CA (US); Timothy Hawkins, Los Angeles, CA (US)

(73) Assignee: OTOY, INC., Los Angeles, CA (US)

( * ) Notice: Subject to any disclaimer, the term of this patent is extended or adjusted under 35 U.S.C. 154(b) by 192 days.

(21) Appl. No.: 13/830,665

(22) Filed: Mar. 14, 2013

(65) Prior Publication Data

US 2013/0314502 A1 Nov. 28, 2013

Related U.S. Application Data

(60) Provisional application No. 61/650,350, filed on May 22, 2012.

(51) Int. Cl.
*H04N 7/18* (2006.01)
*G05D 1/00* (2006.01)
*G05D 1/10* (2006.01)

(52) U.S. Cl.
CPC ........... *H04N 7/181* (2013.01); *G05D 1/0094* (2013.01); *G05D 1/104* (2013.01)

(58) Field of Classification Search
CPC ................... B64C 2201/127; B64C 2201/027
See application file for complete search history.

(56) References Cited

U.S. PATENT DOCUMENTS

| 4,625,938 | A | * | 12/1986 | Brown | 248/550 |
| 5,600,368 | A | * | 2/1997 | Matthews, III | 348/143 |
| 6,685,326 | B2 | | 2/2004 | Debevec et al. | |
| 7,044,613 | B2 | | 5/2006 | Debevec | |
| 7,131,136 | B2 | * | 10/2006 | Monroe | 725/105 |
| 7,436,403 | B2 | | 10/2008 | Debevec | |
| 7,529,004 | B2 | | 5/2009 | Debevec et al. | |
| 8,134,555 | B2 | | 3/2012 | Debevec et al. | |

(Continued)

FOREIGN PATENT DOCUMENTS

| JP | 2006227245 A | 8/2006 |
| JP | 2007235399 A | 9/2007 |

(Continued)

OTHER PUBLICATIONS

Notification of Transmittal of the International Search Report and Written Opinion dated Sep. 27, 2013 (PCT/US2013/041856) 10 pages.

(Continued)

*Primary Examiner* — Zhubing Ren
(74) *Attorney, Agent, or Firm* — James J. DeCarlo; Greenberg Traurig, LLP

(57) ABSTRACT

A subject is imaged using imaging equipment arranged on portable, wireless vehicles. The vehicles are positioned in a pattern in proximity to the subject and illuminate the subject in order to collect image data. The image data can be collected by cameras carried by the vehicles in addition to or instead of external high speed cameras.

25 Claims, 11 Drawing Sheets

(56) References Cited

U.S. PATENT DOCUMENTS

| | | | | |
|---|---|---|---|---|
| 2006/0114324 A1* | 6/2006 | Farmer | ................... | G01S 7/003 348/144 |
| 2009/0021423 A1 | 1/2009 | Cheng et al. | | |
| 2009/0226049 A1 | 9/2009 | Debevec et al. | | |
| 2010/0013927 A1 | 1/2010 | Nixon | | |
| 2012/0038903 A1* | 2/2012 | Weimer | ................... | G01C 3/08 356/4.07 |
| 2012/0044710 A1* | 2/2012 | Jones | ................... | B64C 39/024 362/470 |
| 2012/0179308 A1* | 7/2012 | Peters | ................. | G05D 1/0858 701/13 |

FOREIGN PATENT DOCUMENTS

| | | |
|---|---|---|
| JP | 2009-217524 | 9/2009 |
| JP | 2010045693 | 2/2010 |
| JP | 2010509946 A | 4/2010 |
| KR | 1020110082904 | 7/2011 |
| KR | 1020110134076 | 12/2011 |
| WO | 2010097921 A1 | 9/2010 |
| WO | WO 2011149544 | 12/2011 |

OTHER PUBLICATIONS

Ma, et al. "Facial Performance Synthesis uisng Deformation-Driven Polynomial Displacement Maps" University of Southern California; 10 pages.

Ma, et al. "Rapid Acquisition of Specular and Diffuse Normal Maps from Polarized Spherical Gradient Illumination" University of Southern California: The Eurographics Association 2007 10 pages.

\* cited by examiner

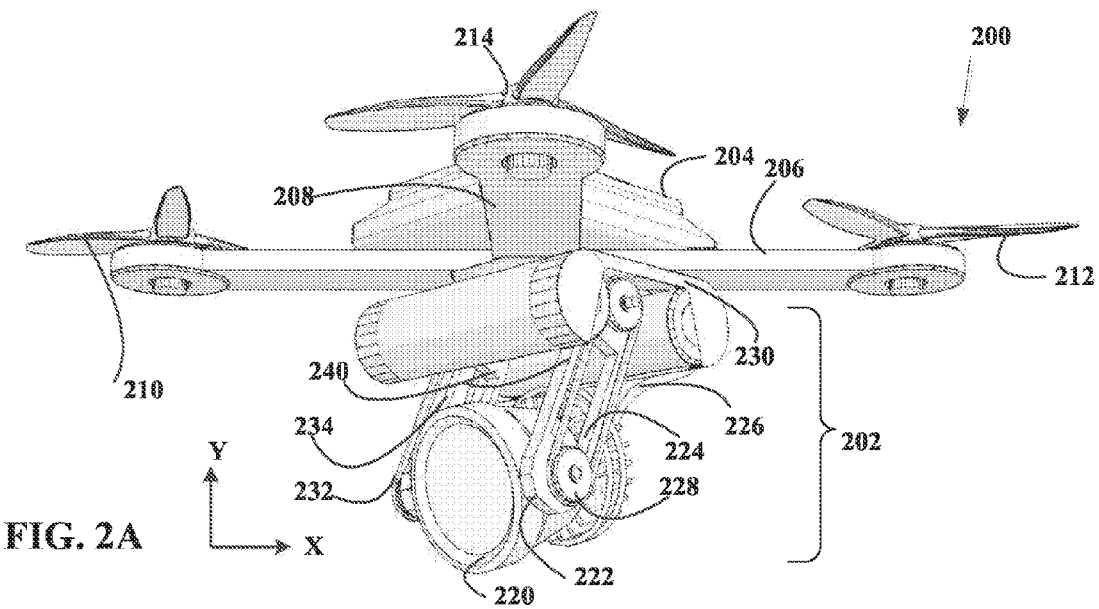
FIG. 2A
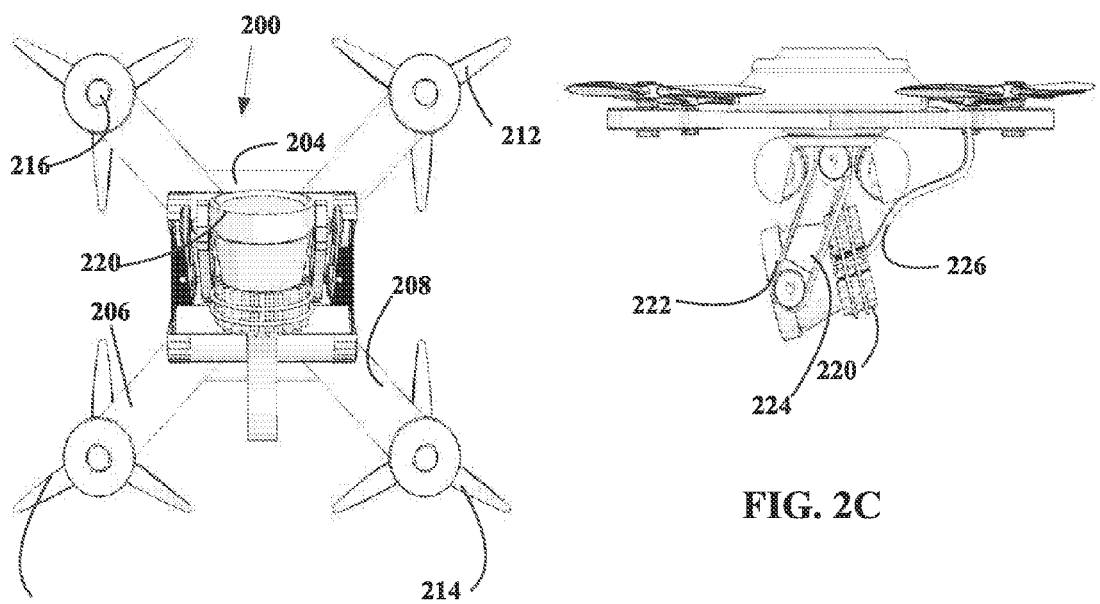
FIG. 2B
FIG. 2C

PORTABLE MOBILE LIGHT STAGE

CROSS REFERENCES TO RELATED APPLICATIONS

This application is a non-provisional of U.S. provisional patent application No. 61/650,350 filed on May 22, 2012 and entitled "Portable mobile light stage", the entirety of which is incorporated herein by reference.

The present disclosure relates generally to photography, digital imaging and/or surface scanning, and, more particularly, to obtaining image data of a subject using portable, wireless, mobile light and/or imaging sources to create a programmable, portable light stage.

BACKGROUND

Photography is the art of capturing light, originally on light-sensitive paper, and today more commonly by means of digital sensors. Optimal use of lighting can make a difference between a good shot and a great one. The importance of lighting in image capture can be observed from the multitude of heavy lighting equipment that is normally present in any professional photographic studio, theater, movie or TV set.

In motion pictures, lighting may be used not only to help actors and sets look their best, but as an integral part of storytelling to set mood, direct attention, and underscore performance. The importance of lighting may be reflected in the high proportion of time and expense spent on lighting: by some estimates, one half or more of the valuable time spent on a set may be involved in setting up the lighting. Moreover, the fact that in large part, the lighting may have to be finalized at the time each scene is filmed and has limited scope for modification in post production phase, adds complication and cost to principal photography. Also, detecting the interplay of lights and shadows on an object provides meaningful information concerning the shape and/or surface characteristics of an object under study.

SUMMARY

This disclosure provides for mobile portable imaging systems and methodologies that can be easily transported and facilitate greater flexibility in collecting imaging data—in short an "on the fly" programmable, portable, flexibly configurable light stage and/or image capture system. The disclosure herein provides for a highly mobile, flexible and reconfigurable light stage and/or image capture environment through the use of lights and/or cameras and/or other sensors being deployed in predetermined or programmable patterns via placement of flying drones, preferably of the quadrotor type, that carry desired sensor equipment and can be flown into a wide variety of patterns or positions or paths to facilitate image data capture.

A method for imaging is disclosed in accordance with one embodiment. The method, executable by a processor, comprises receiving, by the processor, information related to a first pattern comprising a plurality of points representing positions in three dimensional space having therewithin a subject, positioning a plurality of moveable, controllable, flying vehicles, each comprising at least one imaging component, at each of the plurality of points to form the first pattern in the space in proximity to the subject and activating at least one of the imaging components for collecting imaging data of the subject. In one embodiment, various imaging patterns can be presented for selection by a user or a first imaging pattern can be automatically selected by the processor. The activation of the moveable vehicles can further comprise, programming, by the processor, the plurality of moveable vehicles for executing an imaging process for the collection of the imaging data. In an embodiment, the method comprises, receiving, by the processor, user input related to the imaging process and altering, by the processor, the programming of the plurality of moveable vehicles based on the user input. In an embodiment, the positioning of the plurality of moveable vehicles by the processor further comprises, transmitting position information associated with the plurality of points to the plurality of moveable vehicles and controlling, formation of the first pattern by the plurality of moveable vehicles via communication of control signals. In an embodiment, the positioning of the plurality of moveable vehicles by the processor further comprises, receiving, by the processor, imaging requirements for the positions in three dimensional space and attributes of the plurality of moveable vehicles and selecting, the plurality of moveable vehicles for positioning at particular positions based on the attributes and the imaging requirements. The method further includes, re-positioning, by the processor, the plurality of moveable vehicles to form a second pattern in the space in proximity to the subject and activating, by the processor, at least one of the imaging components for collecting imaging data of the subject. In an embodiment, the method includes receiving, by the processor, the collected imaging data from the plurality of moveable vehicles and storing the collected imaging data in a non-transitory computer readable storage medium.

In another embodiment, a computing device, comprising a processor and a storage medium for tangibly storing thereon programming logic associated with the imaging system for execution by the processor, is disclosed. The programming logic comprises pattern receiving logic, executed by the processor, for receiving information related to a pattern comprising a plurality of points representing positions in the three dimensional space. Positioning logic, executed by the processor, positions a plurality of autonomous or semi-autonomous or tethered vehicles such as quadrotor flying vehicles at each of the plurality of points to form the selected pattern in a space in proximity to a subject. At least one of the imaging components comprised in each of the plurality of vehicles is activated by the activating logic executed by the processor in order to collect imaging data of the subject. In one embodiment, re-positioning logic is executed by the processor, for repositioning the plurality of moveable vehicles to form a second pattern in the space in proximity to the subject and activating logic, executed by the processor, for activating at least one of the imaging components for collecting imaging data of the subject. The positioning logic executed by the processor further comprises logic for transmitting position information associated with the plurality of points to the plurality of moveable vehicles and logic for controlling formation of the first pattern by the plurality of moveable vehicles via communication of control signals. In an embodiment, the processor executes requirements receiving logic, for receiving imaging requirements for the positions in three dimensional space, attributes receiving logic, for receiving attributes of the plurality of moveable vehicles and selecting logic, for selecting the plurality of moveable vehicles for positioning based on the attributes and the imaging requirements. A computer readable storage medium, having stored thereon, instructions for execution by a processor is disclosed in accordance with another embodiment. The instructions cause the processor to receive selection of a pattern comprising a plurality of points representing positions in the three dimensional space. The instructions executed by the processor, effect a positioning a plurality of vehicles at each of the plurality of points to form the selected pattern in the space in proximity to a subject whose image data is being collected. At least one of the imaging components comprised within the plurality of vehicles is activated via the instructions from the processor in order to facilitate collecting image data of the subject.

The computer readable storage medium further comprises instructions that cause the processor to reposition the plurality of moveable vehicles to form a second pattern in the space in proximity to the subject and activate at least one of the imaging components for collecting imaging data of the subject. The computer readable storage medium of claim also comprises instructions that cause the processor to receive the collected imaging data from the plurality of moveable vehicles and store the collected imaging data in a non-transitory computer readable storage medium. The stored instructions also cause the processor to transmit position information associated with the plurality of points to the plurality of moveable vehicles and to control formation of the first pattern by the plurality of moveable vehicles via communication of control signals.

A method of collecting imaging data is disclosed in an embodiment. The method comprises positioning, by a processor, a moveable, controllable, flying vehicle at a point in three dimensional space such that the moveable vehicle is part of a pattern formed by other moveable vehicles. The method further comprises receiving, by the processor, an activation signal to begin an imaging procedure, executing, an imaging procedure and collecting, image data of a subject by executing the imaging procedure.

A imaging system comprising a controller and a plurality of moveable vehicles is disclosed in accordance with one embodiment. The controller comprises a processor and computer readable storage medium which includes programming logic executed by the processor. The programming logic includes pattern receiving logic for receiving selection of a pattern comprising a plurality of points representing positions in three dimensional space, positioning logic for positioning the plurality of moveable vehicles at each of the plurality of points to form the selected pattern in the space in proximity to a subject, each of the plurality of vehicles comprises at least one imaging component and activating logic for activating at least one of the imaging components in order to collect imaging data of the subject. In addition, the computer readable storage medium further comprises a plurality of imaging patterns for selection. In one embodiment, the plurality of moveable vehicles are drones, such as, quadrotors each of which include at least one imaging component selected from a group of components comprising light sources, such as an LED (light emitting diode), a camera, an optical sensor, an infrared sensor, a radio sensor and a polarized light source.

An imaging system comprising at least one imaging component and a processor are disclosed in an embodiment. The computer readable storage medium comprises logic executed by the processor for carrying out various tasks. The logic can comprise coordinates receiving logic, for receiving coordinates representing a position in a three dimensional space, positioning logic, for positioning the imaging system at the position represented by the received coordinates, activation signal receiving logic for receiving a first activation signal for the imaging component and activating logic, for activating the at least one imaging component in accordance with the received first activation signal upon the system being positioned at the position represented by the received coordinates. In an embodiment, the imaging component is a light field camera. In an embodiment, the imaging system comprises a plurality of imaging components and the stored logic comprises multiplexing logic so that at least a subset of the plurality of imaging components emit light in different multiplexed patterns.

These and other embodiments and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 2A is an illustration showing one of the vehicles in accordance with an embodiment of the present disclosure;

FIG. 2B is an illustration showing the underside of the vehicle in accordance with an embodiment of the present disclosure;

FIG. 2C is an illustration showing a side view of the vehicle in accordance with an embodiment of the present disclosure;

DESCRIPTION OF EMBODIMENTS

Figure 1:
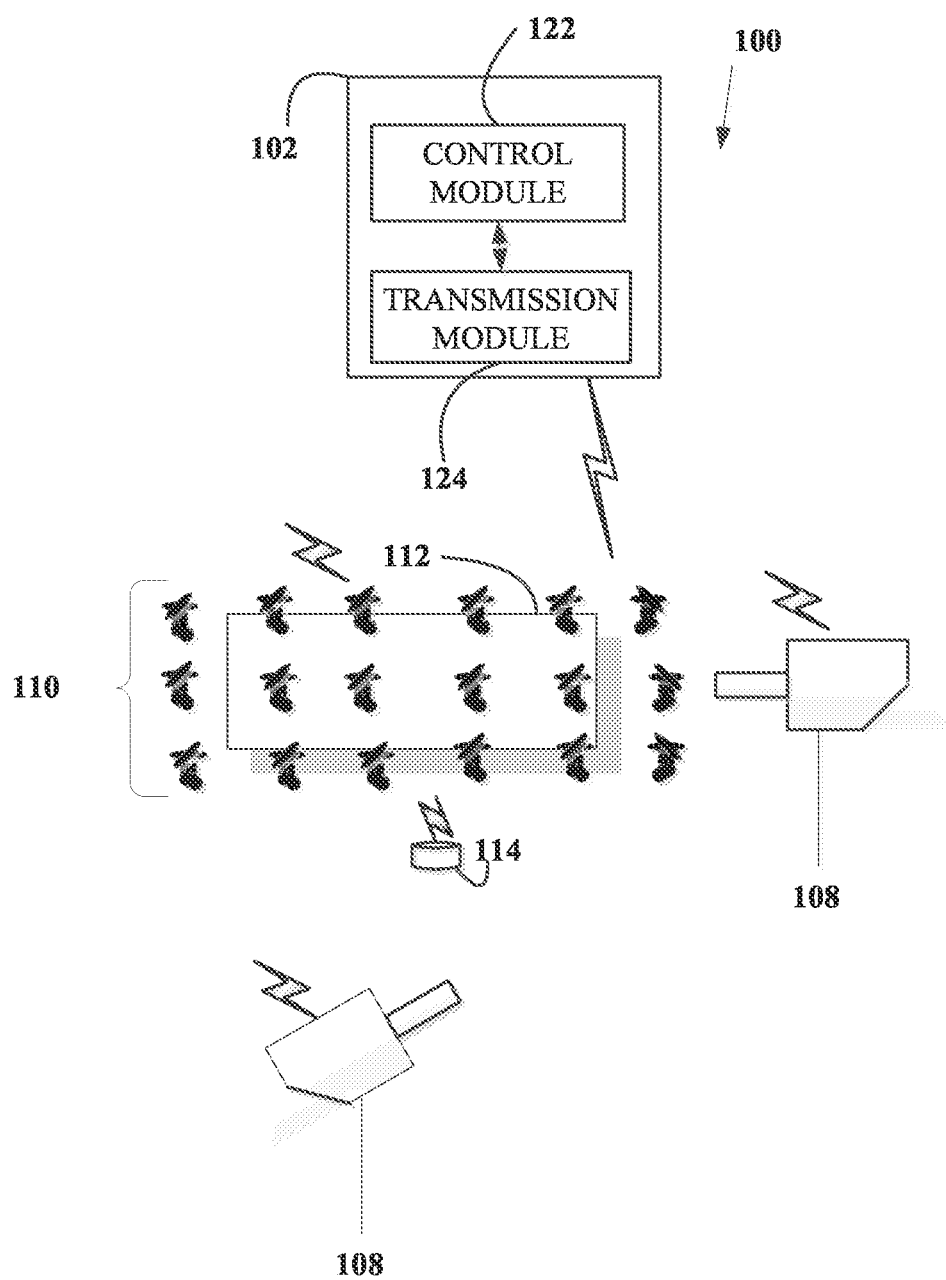
FIG. 1 illustrates an imaging system collecting image data of a subject in accordance with an embodiment of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

An imaging apparatus and method are described that provide for replacement of substantially stationary imaging and/or lighting equipment with light-weight, low-cost, programmable, mobile, portable equipment that provides great flexibility in illuminating and collecting imaging data of a subject including but not limited to, one or more of an actor, an object or an environment at large, such as, a room or an outdoor location. During image data capture, a stationary or moving subject can be illuminated with lights placed at different positions around the subject. The lighting can be deployed as a number of static lights configured in a programmed or predetermined pattern or a series of time-multiplexed basis lighting configurations or conditions. Preferably, a high-speed digital or analog video camera records the image data captured during the various lighting conditions presented by the mobile lighting platform described herein. Such recording is used, by way of non-limiting example, to capture data that represents surface details of the person or object with high precision. This data can be used in later processing to rebuild images of the object for various uses such as, for example, computer generated visual effects for movies or gaming. The lighting equipment can also include polarizing filters that are employed to obtain specular or diffuse lighting for high resolution applications.

In heretofore known light stage applications, lights are arranged around the subject either disparately or in a fixed configuration on a structure such as a sphere, grid or a hemisphere to be focused on the subject. However, such lighting equipment provides limited maneuverability and is not portable, requiring that the subjects being photographed or filmed be bought to the location of the structure. In contrast to the such fixed systems, the disclosure herein provides for a highly mobile, flexible and reconfigurable light stage and/or image capture environment through the use of lights and/or cameras and/or other sensors being deployed in predetermined or programmable patterns via placement of flying drones, preferably of the quadrotor type, that carry desired sensor equipment and can be flown into a wide variety of patterns or positions or paths to facilitate image data capture.

FIG. 1 illustrates an imaging system 100 that collects image data of a subject 112. The imaging system 100 comprises a plurality of wireless, programmable flying or otherwise mobile vehicles 110 (see e.g., FIGS. 2A-C), each carrying a payload comprising imaging equipment such as but not limited to, one or more of light sources, light sensors, filters and cameras, operating in the visible and or non-visible spectra, or combinations thereof (e.g., visible and infra-red light).

In an embodiment, the wireless, programmable vehicles can comprise small rotorcrafts such as, robotic quadrotors or drones which can be programmed to fly along specific trajectories and/or hover, levitate or float in the air at particular positions in a three dimensional space. As used herein, the example of use of a quadrotor flying vehicle is intended to convey an embodiment, but other mobile vehicles now known or to become known can be used, and are contemplated to be used, in the context of implementing the various systems, methods and functional alternatives presented herein.

Each of the plurality of quadrotors 110 can be configured to fly independently and can have a respective trajectory mapped out to reach and levitate at a particular position or continuously or repeatedly follow a certain trajectory in space. However, they can also be remotely controlled or their flight paths can be monitored and altered by a controller 102. In one embodiment, the controller 102 can include one or more computing devices such as a laptop, a handheld user device or a server computer or combinations thereof. The controller 102 can be coupled to the quadrotors 110 via mechanisms such as but not limited to, optical, infra red, sonar, lidar, radio links or wired tethers. In an embodiment, imaging equipment such as cameras, light sources, filters or combinations thereof can be provided on the quadrotors 110. For example, some of the quadrotors 110 can carry light sources that include LEDs (light emitting diodes) which emit bright light utilizing less power while others may carry cameras alone or in addition to LED light sources, or alone in combination with sonar, radio or light sensors.

As shown in FIG. 1, the quadrotors 110 are arranged in a particular pattern with respect to the subject 112 being imaged. It may be appreciated that the number and pattern of the quadrotors 110 is shown only by the way of illustration and that greater or lesser number of quadrotors 110 can be used in various patterns to generate different lighting conditions or to collect image data from various positions or angles as will be detailed further herein. In one embodiment, each of the quadrotors 110 can receive a respective, unique position information from the controller 102, map a flight path or trajectory in order to reach a respective, designated position at a predetermined time. In an embodiment, the controller 102 can be a computing device, such as, a desktop or laptop computer or a mobile computing and communication device such as a smartphone that is capable of storing and communicating instructions for controlling the one or more quadrotors 110. The position information for each quadrotor can be generated based on one or more of a selected arrangement for the plurality of quadrotors, or attributes of the quadrotors 110 as will be detailed further herein. In one embodiment, the controller 102 and/or the subject 112 in combination with the ground or base surface can be used by the quadrotors as a reference entity to achieve their respective positions. In one embodiment, one or many radio source 114 can be placed at the location of the subject 112 so that the quadrotors are able to identify the subject and therefore position themselves accordingly in a designated pattern in proximity to the subject 112. This can be useful in external or outdoor environments where there may be a multitude of objects and particular identification of the subject 112 to be imaged may be required. Alternatively, sonar can be used (either on the quadrotor itself or using an external sonar device to track the quadrotor) to provide position information to one or more of the quadrotors relative to the subject or other object of known position or other quadrotors.

The subject or object 112 being imaged is thus illuminated with the light from the quadrotors 110. In an embodiment, all the quadrotors need not emit light. In an embodiment, the quadrotors can be pre-programmed to activate the LEDs and illuminate the subject 112 with a sequence of time-multiplexed lighting configurations. The light sources on quadrotors 110 can be selectively activated to emit light at a particular time after the quadrotors 110 reach their designated positions. Image data of the subject 112 thus illuminated can be recorded by one or more of the cameras 108. In one embodiment, the camera(s) 108 can also be controlled by the controller 102 when the quadrotors 110 have achieved the desired formation and illuminate the subject 112 in a desired manner. In an embodiment, the functioning of the camera(s) 108 and the plurality of quadrotors 110 can be synchronized such that the camera(s) 108 automatically capture the image data upon the quadrotors 110 achieving particular configurations. Again, it may be appreciated that the number of cameras 108 is shown only by the way of illustration and not limitation and that more or less number of cameras can be used to collect image data. In an embodiment, the image data can be collected by cameras located on the quadrotors 110 themselves in addition to or instead of the cameras 108. As the quadrotors 110 are small and wireless, they are portable and may be carried easily to a location of the subject 112. As described supra, the plurality of quadrotors 110 can comprise different types of lights, cameras, filters, sensors or combinations thereof. Hence, in contrast to the efforts and time utilized in adjusting conventional lighting and camera equipment, the imaging system 100 affords simple adjustments wherein one or more of the quadrotors 110 can be swapped with other different type(s) of quadrotors carrying different types of imaging equipment in order to produce a different lighting effect or record different type of image data as needed. Moreover, the independent motion of each of the quadrotors 110 provides great flexibility in finely adjusting the settings, such as but not limited to the distance or focus, between a particular light source and/or camera and the subject 112 thereby affording greater precision in capturing image data of the subject 112. In some embodiments the quadrotors can be configured to create a light field camera or plenoptic camera. A light-field camera aims to measure the intensity and direction of every incoming ray instead of merely recording the sum of all the light rays falling on each photosite at a sensor. With such information every possible image of whatever is within the field of view of the camera at the moment of image capture can be generated. A single capture from a light-field camera can provide digital data such that focus, exposure and even depth of field are adjustable after the image is captured.

In one embodiment, the controller 102 comprises a control module 122 and a transmission module 124. The control module 122 can be configured to monitor the trajectories of each of the quadrotors 110 by using visual, light or sound positioning techniques and modify the trajectories if and as necessary. In one embodiment, the control module 122 can receive feedback from each of the quadrotors 110 regarding their positions thereby enabling it to monitor their progress along particular trajectories. In one embodiment, the feedback can be displayed to a user monitoring the progress of the quadrotors via an image or a video on a display. For example, due to external influences such as wind pressure in an outdoor location, one of the quadrotors 110 can deviate from a predetermined path or position. Such deviation can be monitored by the control module 122 which can send instructions via the transmission module 124 to reset the deviating quadrotor back to the original path via the communication channel that it maintains with the quadrotor. In an embodiment, such functionality to track and reset the trajectory upon deviation can be present within the quadrotor itself.

In an embodiment, the control module 122 can additionally provide instructions to control the functioning of the camera(s) 108 such that each of the camera(s) 108 can be configured to collect imaging data of the subject 112 upon the quadrotors 110 assuming a particular arrangement and illuminating the subject 112 in a specific manner. As discussed supra, the subject or object 112 being imaged can include living beings, scenery or other objects. In an embodiment, if the subject 112 is an element capable of receiving instructions from a processor, accordingly it may also be controlled via the control module 122. In one embodiment, the camera(s) 108 can also be moved by larger quadrotors or other moving equipment such as lifts/cranes/trolleys/steadicams which are capable of finer movements or adjustments while ensuring the stability of the camera(s) 108.

FIG. 2A is an illustration showing one of the quadrotors 200 in accordance with an embodiment of the present disclosure. It may be appreciated that FIG. 2A and related description is only provided only by the way of illustration and not limitation and that any type of aerial or multi-mode vehicle of suitable attributes currently known or to be invented can be employed in the imaging system 100. Moreover, it can be further appreciated that all the quadrotors in a given pattern need not be identical and that different quadrotors of different sizes and various attributes (such as by way of non-limiting example, weight carrying capacity, flight duration capability, inertial characteristics, processor capacity, among other characteristics) can be used at different positions in a single formation. The quadrotor 200 includes a body portion 202 located underneath an upper frame 204. The frame 204 operates to hold two shafts 206 and 208 fixed to the body portion 202 one above the other in a 'X' shaped configuration. Each of the shafts 206 and 208 comprises two rotors at each end. Only two rotors 210 and 212 of shaft 206 and one rotor 214 of shaft 208 are seen in FIG. 2A. Thus, in one embodiment, the quadrotor 200 can comprise of four rotors in total, with two pairs of counter-rotating, fixed-pitch blades located at the four corners of the vehicle.

The body portion 202 can also comprise a power source to power the vehicle and its onboard circuitry along with any computer readable storage media as will be detailed further herein. In addition, the body portion 202 comprises one or more imaging component(s) 220 such as but not limited to, light sources, cameras, filters, sensors and combinations thereof. In one embodiment, the imaging component 220 is connected to the base 230 by a symmetrical support mechanism 240 via two wheels located on either side of the imaging component 220 one 228 of which is seen in FIG. 2A. The support mechanism 240 further includes two movable elongated frame members 222, 232 each with a respective groove 224 and 234. Each of the wheels of the imaging component 220 is operable to slide within their respective grooves 224, 234 based on the movements of the frame members 222 and 232. In one embodiment, the support mechanism 240 can be configured as an electro-mechanical robotic arm capable of a variety of movements under instructions from a processor on board the quadrotor 200 or the controller 102. Based on the received instructions, the frame members 222, 232 move back and forth along the horizontal (X) axis thereby causing the imaging component 220 to slide within the grooves 224 and 234. In one embodiment, the movement of the frame members 222, 232 along the X Axis can cause a variation of height of the imaging component 220 along the Y Axis from a mean position. In one embodiment, the support mechanism 240 can tilt the imaging component 220 via the movement of the frame members 222, 232 and a rotation of the wheels attached to the imaging component 220. This can provide greater flexibility in terms of finer distance/focus adjustments between the imaging component 220 and a subject being imaged. In an embodiment the component 220 can be moved to be "aimed" in an area comprising at least a hemisphere in a manner known and used in a variety of intelligent moving head lights. Again, it may be appreciated that the number of imaging components 220 on the quadrotor 200 is shown only for illustration and is by no means limiting and that greater number of imaging components 220 can be strategically placed at various positions on the quadrotor 200. The quadrotor 200 additionally or optionally includes a cable 226 that connects the imaging component 220 to one or more of a processor or power source thereby carrying instructions and/or power signals to the imaging component 220.

In an embodiment, the imaging component 220 can be a light source including one or more light emitting diodes (LEDs) which provide bright light while consuming low power. If the quadrotor 200 includes one or more light sources, it can also optionally include a heat sink to absorb any heat generated when the light sources are operated for a considerable time period. In an embodiment, the imaging component 220 can be a camera. In an embodiment, the imaging component 220 can include both a light source such as the LEDs and a camera as discussed herein. In a further embodiment, the imaging component 220 can be configured to receive one or more filters, such as but not limited to, polarizing filters for generating specular and diffuse lighting conditions.

FIG. 2B is an illustration showing the underside of the quadrotor 200. The fourth rotor 216 located opposite to the rotor 214 on shaft 208 is seen in FIG. 2B.

FIG. 2C is an illustration showing a side view of the quadrotor 200. The arrangement of the frame 222, groove 224 and the cable 226 with respect to the imaging component 220 can be clearly seen.

Figure 3:
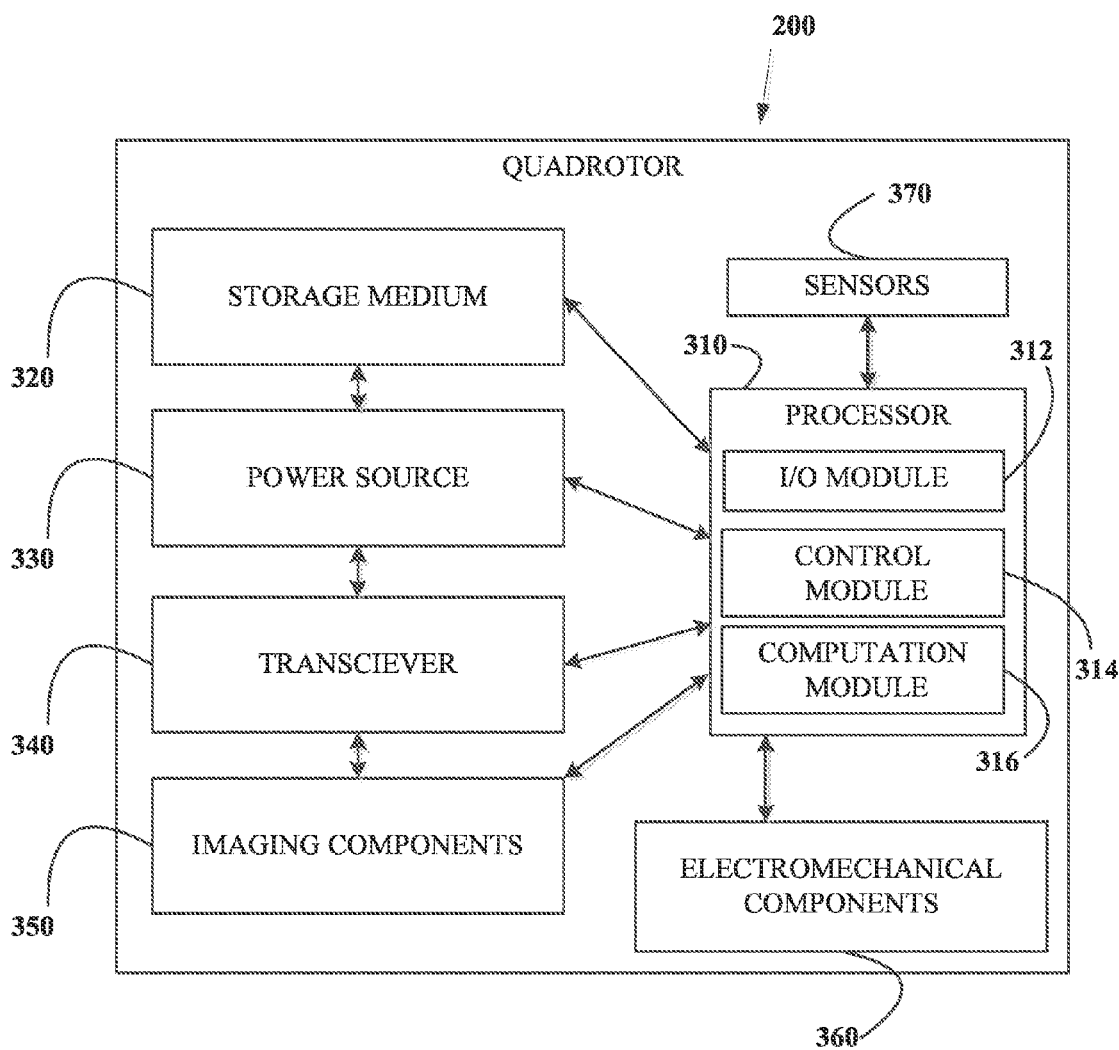
FIG. 3 is a block diagram depicting certain elements within the vehicle in accordance with an embodiment.

FIG. 3 is a block diagram depicting certain elements within the quadrotor 200 in accordance with an embodiment. As described supra, quadrotors are vehicles capable of independent flight along specific trajectories. Some of the quadrotors are also capable of trajectory tracking and dynamically mapping the flight path. They are produced in different sizes ranging from large unmanned aerial vehicles capable of carrying payload in the order to kilograms to small toy sized vehicles. In one embodiment, each of the quadrotors 110 can be substantially similar to the smaller sized vehicles. Thus, by the way of illustration and not limitation, each of the quadrotors can weigh about 200-400 grams, have the rotor shafts 206/208 with length spanning approximately ten inches and capable of carrying a few grams or a few ounces of payload for a short time period of about ten minutes. By the way of illustration and not limitation, each quadrotor 200 can comprise a processor 310, storage medium 320, a power source 330, a transceiver 340, imaging components 350, electromechanical components 360 and sensors 370. The sensors 370 can include any type of heat, light or position sensors to provide different kinds of input to the processor 310 in order to execute its various tasks as detailed herein.

The processor 310 is communicatively coupled to each of the other components of the quadrotor 200 via the I/O module 312 and controls them via instructions from the control module 314. The processor 310 additionally comprises a computation module 316 which can facilitate various trajectory/position computations or adjustment computations for imaging components 350 as will be detailed further infra. In one embodiment, the instructions to control the flight path or trajectory of the quadrotor are predetermined and stored in the storage medium 320. As shown in FIG. 1, the plurality of quadrotors 110 are arranged in a specific pattern or geometric shape relative to each other and relative to the subject 112 being imaged. In one embodiment, the exact position for each of the quadrotors 110 within a particular pattern is pre-calculated with respect to one or more reference points and fed to the respective quadrotors. Accordingly, the appropriate instructions are stored in the storage medium 320 of the quadrotor 200 which instructions are used by the processor 310 in conjunction with the data from the sensors 370 to control the electromechanical components 360 such as the rotors in order to achieve the designated position in the pattern. In one embodiment, the position of the quadrotor in a pattern can be characterized in terms of its position from multiple reference entities such as the ground and the subject being imaged. For example, if the quadrotor 200 is to be positioned within a pattern such as a hemispherical or a spherical pattern around a subject 112 being imaged, the position data can be defined in terms of the height from the ground and distance from the subject or other appropriate reference entities. Thus, the processor 310 utilizes the instructions from the storage medium 320 and data from the sensors 370 in order to accurately position the quadrotor 200 in a particular imaging pattern. In one embodiment, the processor 310 can further employ the sensor data to achieve functionality such as adjustment of trajectory in case of a deviation or collision avoidance or finer position adjustments with respect to other proximate quadrotors when forming a pattern.

Upon the quadrotor 200 being positioned accurately, the processor 310 facilitates adjustments of the imaging components 350 in accordance with instructions retrieved from the storage medium 320. Alternately, the instructions can be provided by the controller 102 upon the quadrotor 200 reaching a desired position. If the imaging components 350 comprise one or more light sources, the instructions can cause light source(s) to be adjusted in order to focus the light on the subject 112 being imaged at a particular time and at a specific angle or at a specific polarization. Accordingly, the processor 310 coordinates the functioning so that the electromechanical components 360 angle the light source precisely and the power source 330 supplies power to the light source at a particular time in order to illuminate the subject 112. Similar steps can be executed by the processor 310 if the imaging components 350 include a camera, a filter or combinations thereof. The camera (and/or the light source) can be precisely angled based on the instructions from the processor 310 and activated with pulses from the power source 330 so that image data of the subject 112 can be collected at a precise time under specific lighting conditions. In one embodiment, any image data collected by the quadrotor 200 can be stored in the storage medium 320 for later retrieval. The quadrotor 200 can also be configured to transmit collected image data to external elements such as but not limited to, the controller 102 automatically or in response to a request, in order to optimize the usage of onboard memory.

Figure 4:
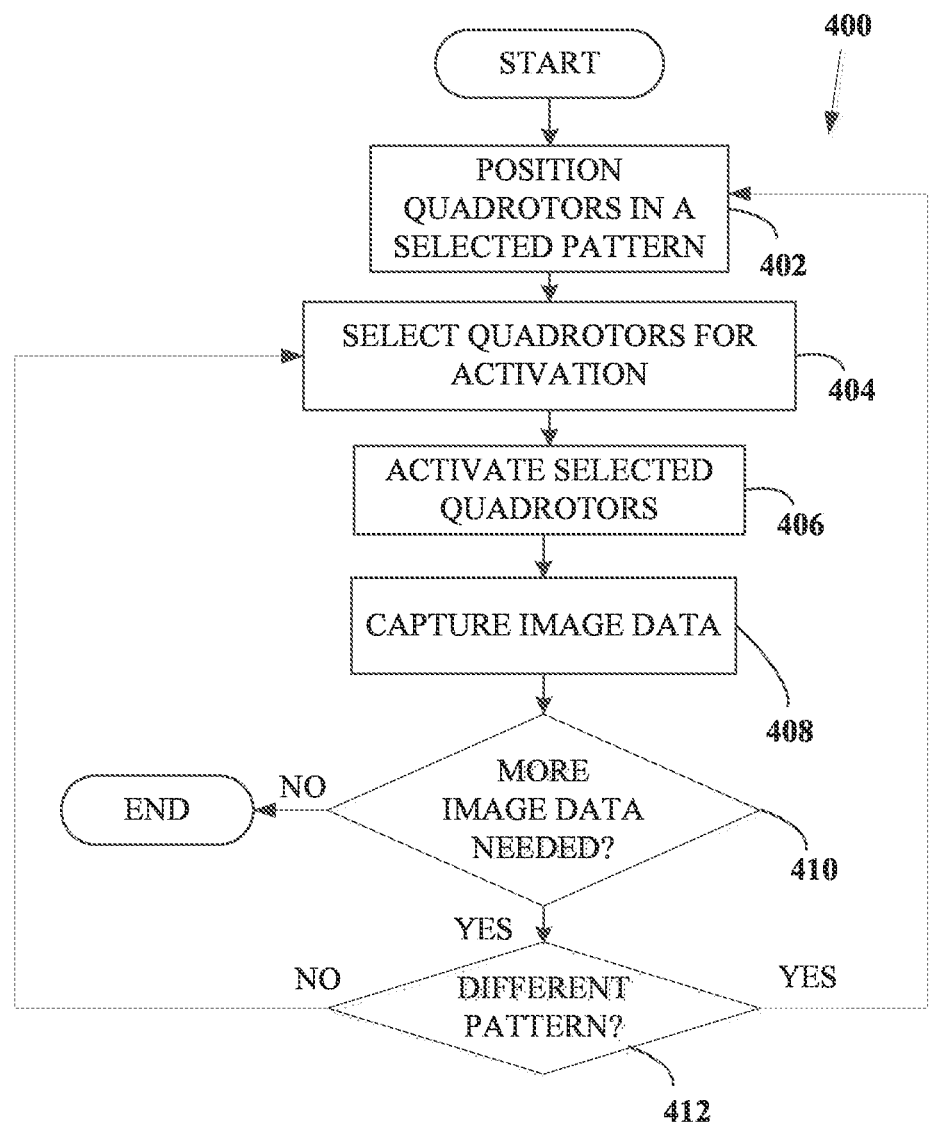
FIG. 4 shows a flowchart illustrating an embodiment of a method of generating image data in accordance with an embodiment.

FIG. 4 shows a flowchart 400 illustrating an embodiment of a method of generating image data of a subject. The method begins at 402 wherein a plurality of moveable vehicles, such as, quadrotors are positioned within a three dimensional space in a selected pattern or geometry. The pattern for arranging the quadrotors can be selected depending on various factors including but not limited to, the size of the subject being imaged, the nature of the surface/subject being imaged, the kind of image data necessary and the attributes of the quadrotors. At 404, at least a subset of the plurality of quadrotors are selected for activation. The quadrotors can be programmed to automatically execute tasks such as emitting light and/or collecting image data of the subject or combinations thereof at predetermined time points upon reaching their designated positions within the pattern. In an embodiment, the controller 102 can activate only some of the quadrotors to emit light and/or collect image data at specific time intervals. In an embodiment, a combination of the aforementioned events can occur wherein the quadrotors are pre-programmed to execute the tasks related to collecting image data at particular time points when the controller 102 may interfere with their functioning to deactivate or activate an otherwise idle quadrotor to emit light and/or collect image data based for example, on user input. Therefore, the selected quadrotors are activated as shown at 406 and the image data is captured at 408. The image data can be collected by cameras included within the quadrotors or it can be collected by external high speed cameras or a combination of the quadrotors and the external cameras can also be employed in accordance with embodiments described herein. At 410, it is determined if there is more image data that needs to be collected. If no more image data remains to be collected the process terminates on the end block. If at 410, it is determined that more image data needs to be collected, the procedure moves to 412 where it is determined if the quadrotors should be arranged in a different pattern. If the quadrotors need to be arranged in a different pattern prior to collecting image data again, the procedure moves to step 402 wherein the quadrotors are positioned in a new pattern. If it is determined at 412 that the quadrotors need not be arranged in a new pattern and they only need to be re-activated within the current pattern, the procedure moves to step 404 wherein the quadrotors are selected for activation. The quadrotors can be the programmed to emit light in different time multiplexed patterns or they can also be programmed to utilize different imaging components at different time points if they have more than one imaging component.

Figure 5:
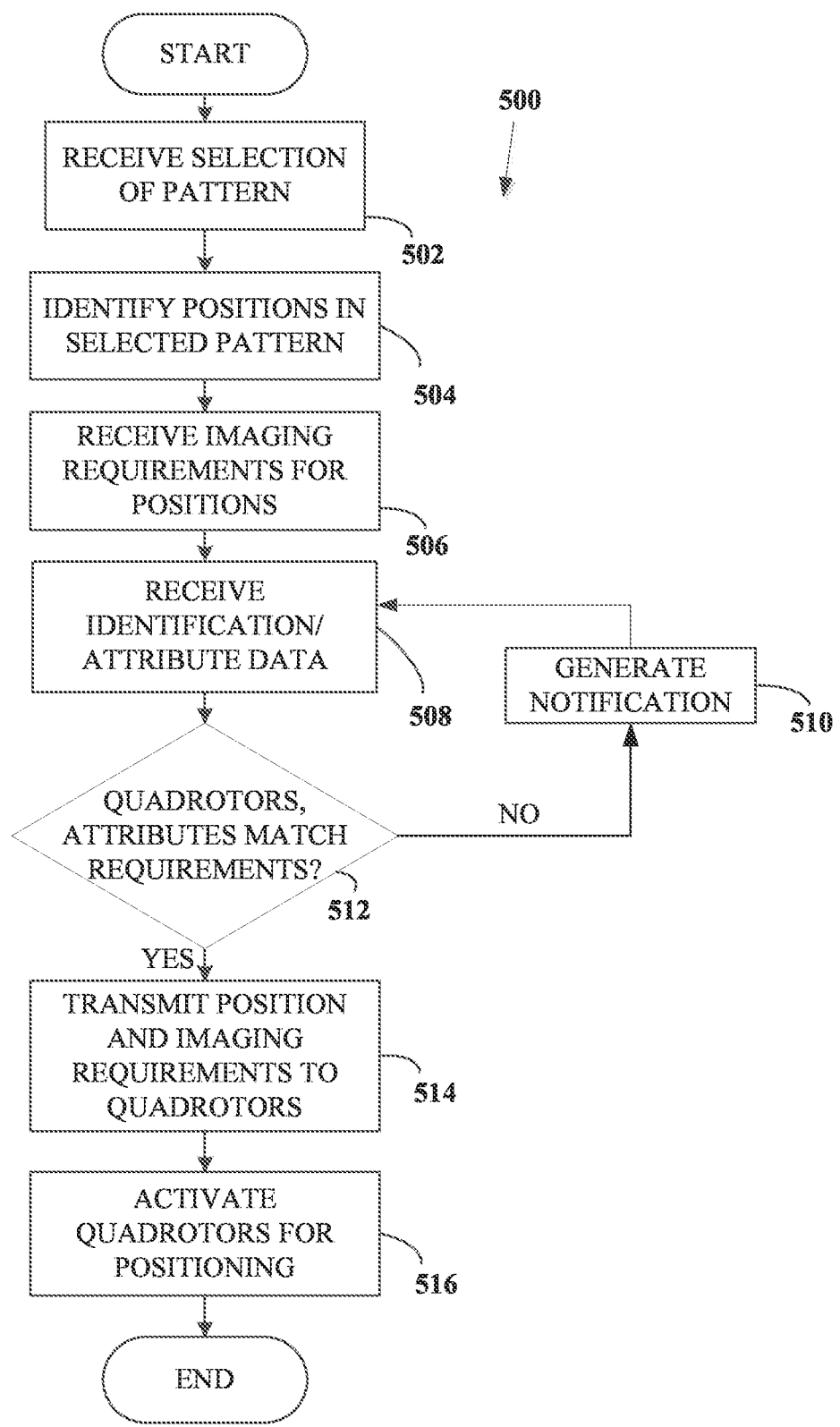
FIG. 5 shows a flowchart illustrating an embodiment of a method of positioning vehicles in accordance with an embodiment of the present disclosure.

FIG. 5 shows a flowchart 500 illustrating an embodiment of a method of positioning quadrotors in accordance with one embodiment. It may be appreciated that the details of the methodology to position the vehicles or quadrotors is shown only by way of illustration and not limitation and that other methodologies for positioning the vehicles can also be employed in accordance with embodiments of the present disclosure. The procedure begins at 502 wherein selection of a pattern for arranging the moveable vehicles or quadrotors is received. As detailed supra, various patterns comprising a plurality of points representing positions in three dimensional space can be selected based on the nature of the subject being imaged and the imaging data required. At 504, the positions or points within the pattern are identified, which provides the number of quadrotors required for the formation of the pattern. In an embodiment, a three dimensional model of the selected pattern can be generated/simulated by a processor based on user input. In an embodiment, the selected pattern can be simulated by the processor with reference to the location of the subject to be imaged. The positions for the quadrotors within a selected pattern can either be determined by the processor alone or in combination with a human operator in an embodiment. In one embodiment the user can determine where particular quadrotors should be placed within the pattern, for example, by clicking at the particular points on the 3D model. The processor can be configured to store the coordinates of the points receiving the user clicks. The positions in the pattern may be defined in terms of various coordinate systems, e.g., Cartesian coordinates or spherical coordinates. In different embodiments, the processor can be configured to suggest quadrotor patterns for user selection or even automatically select certain imaging patterns based on the attributes of the subject such as but not limited to the shape of the subject, nature and the area of surface being imaged. In an embodiment, certain imaging requirements such as the type of imaging equipment to be positioned can be associated with the selected positions. For example, a default imaging requirement of having a light source can be associated with each of the selected positions within the pattern. Such imaging requirements of the positions can be further modified based on user input. Thus, a user can specify if a light source, a camera or their combination with a filter should be placed at each position and any particular settings to be associated with such equipment. Accordingly, at 506, the imaging requirements for each position are received. Upon receiving the imaging requirements for the positions, the identification and attribute data of the quadrotors selected by a user for positioning is received at 508. By way of illustration and not limitation, the user can select the quadrotors having appropriate equipment and/or attributes for the formation of the pattern to collect image data. In an embodiment, each quadrotor can be uniquely identified via a respective ID which can also indicate its attributes such as the imaging components it has on board. The identification data from the quadrotors can be obtained via communication technologies such as but not limited to, Bluetooth or WiFi. For example, the quadrotors can have their identification and attribute information encoded on respective passive or active RFID (radio frequency identification) tags in order to provide the position and attribute data. At 512, it is determined if the selected quadrotors and their attributes match the previously received imaging requirements for the positions. For example, if the selected pattern and position requirements include ten quadrotors, two with cameras and eight with light sources, it is determined at 512 if there are ten quadrotors that satisfy the specified requirements. In case it is determined at 512 that the quadrotors selected for pattern formation do not match the specified requirements, a user notification can be generated as shown at 510 and the user can be provided an opportunity to rectify the error. Subsequently, the process can return to step 508 to obtain the identification and attribute information of the quadrotors. If it is determined at 512 that the selected quadrotors satisfy the requirements, the position data and imaging requirements are transmitted to the quadrotors at 514. In one embodiment, each quadrotor can receive only data associated with its position and its respective imaging settings. In an embodiment, the entire position and imaging data set is transmitted to all the quadrotors which can recognize or obtain their respective data from the received data set. When the process of obtaining and transmitting the position and imaging data is complete and the subject to be imaged is appropriately positioned, the quadrotors can be activated for positioning or for pattern formation as shown at 516.

Figure 6:
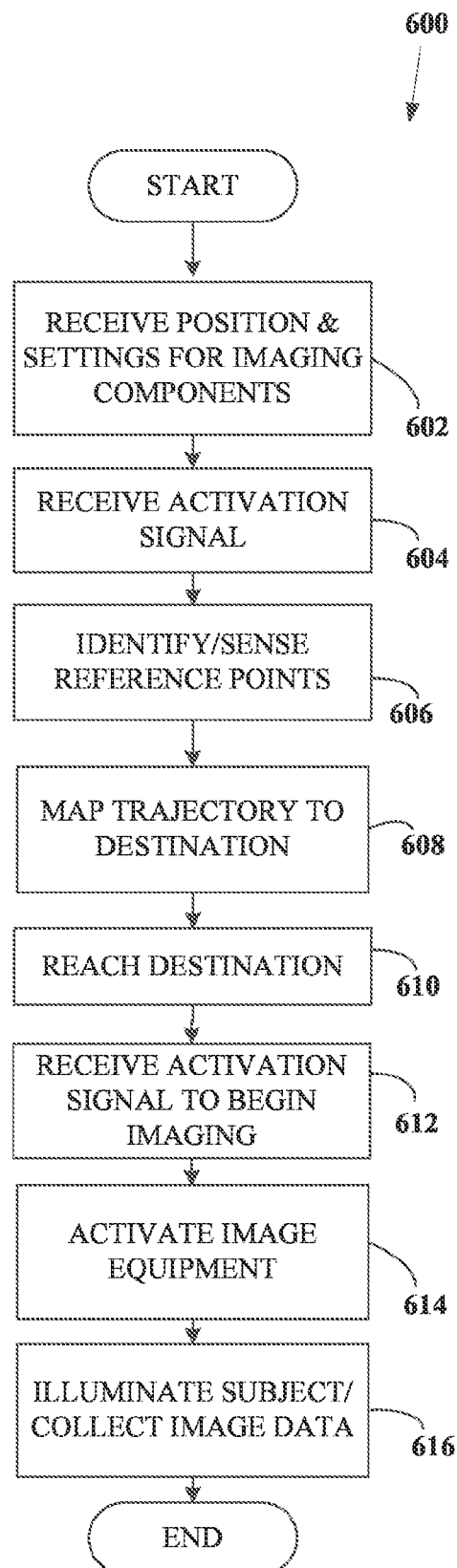
FIG. 6 shows a flowchart illustrating an embodiment of a method of collecting image data in accordance with an embodiment of the present disclosure.

FIG. 6 shows a flowchart 600 illustrating an embodiment of a method of collecting image data. The method commences at 602 wherein position information or data such as coordinates of a position in a particular pattern and imaging requirements associated with the position are received by a quadrotor. In an embodiment, the position coordinates of the quadrotor can be defined with respect to one or more reference entities based on different factors such as but not limited to, the pattern to be formed or the subject to be imaged, the location at which the subject is being imaged or combinations thereof. In addition, the imaging requirements such as, the settings of the imaging equipment including but not limited to, brightness of the light sources, angle and focus of the light sources or cameras, can also be received at 602. Again, as described herein, the quadrotor can receive only its information or it can receive position/settings information of the entire pattern and it can obtain its respective information from the received data set. At 604, the activation signal to form the pattern is received. At 606, the reference entities with respect to which the coordinates are defined and the pattern is to be formed are identified. In an embodiment, only a single reference plane such as the ground may be sufficient to form the pattern. However, the quadrotor can require more than one reference entity to identify its position. For example, one or many radio sources giving out radio emissions can be placed at the location of the subject so that the quadrotor can employ the ground and the radio source(s) as references to identify its destination point in the three dimensional space. At 608, the quadrotor maps the trajectory to its destination position. As described supra, a computational module can be included in the processor which can receive or identify the position data, reference location data and the current location of the quadrotor as input and map a trajectory from the current location to the destination. Various algorithms now known or to become known can be employed by the quadrotors for independent trajectory planning and tracking. In accordance with one algorithm, to generate dynamically feasible trajectories, an initial plan is generated through the environment which satisfies collision and obstacle avoidance constraints. Such algorithm can further allow for real-time planning in cluttered environments also based on techniques such as visibility graphs. The resulting trajectories are defined in simple geometric terms of lines and connecting curves with accompanying desired velocities along each segment. Then, a feasible set of inputs and travel speeds is computed based on the curvature of the path, given speed and acceleration constraints on the vehicles. At 610, the quadrotor navigates to and reaches its destination. It can be appreciated that the various components included in the quadrotor, such as the processor, sensors and electromechanical components aid in maneuvers such as, collision avoidance and trajectory tracking, so that the quadrotor can reach its destination. In an embodiment, the progress of a plurality of quadrotors is monitored as they navigate to their destinations to provide feedback in case of a deviation or an impending collision. Upon reaching the destination, the quadrotor can levitate at the destination position and await a signal that indicates the commencement of the imaging procedure. In an embodiment, the progress of the quadrotors can be monitored and upon the all the quadrotors reaching their respective destinations and forming the complete pattern, a signal to begin the imaging procedure can be received by a quadrotor as shown at 612. In an embodiment, the instruction set for the entire imaging procedure can be provided to each of the quadrotors and a quadrotor can identify its particular instructions from the received instruction set. Such identification can either occur due to the quadrotor id being associated with the instructions or due to the position information associated with the instructions. Accordingly, the imaging equipment on board the quadrotor is activated as shown at 614 in accordance with the received instructions in order to execute tasks such as illuminating the subject or collecting the image data or combinations thereof as shown at 616.

Figure 7:
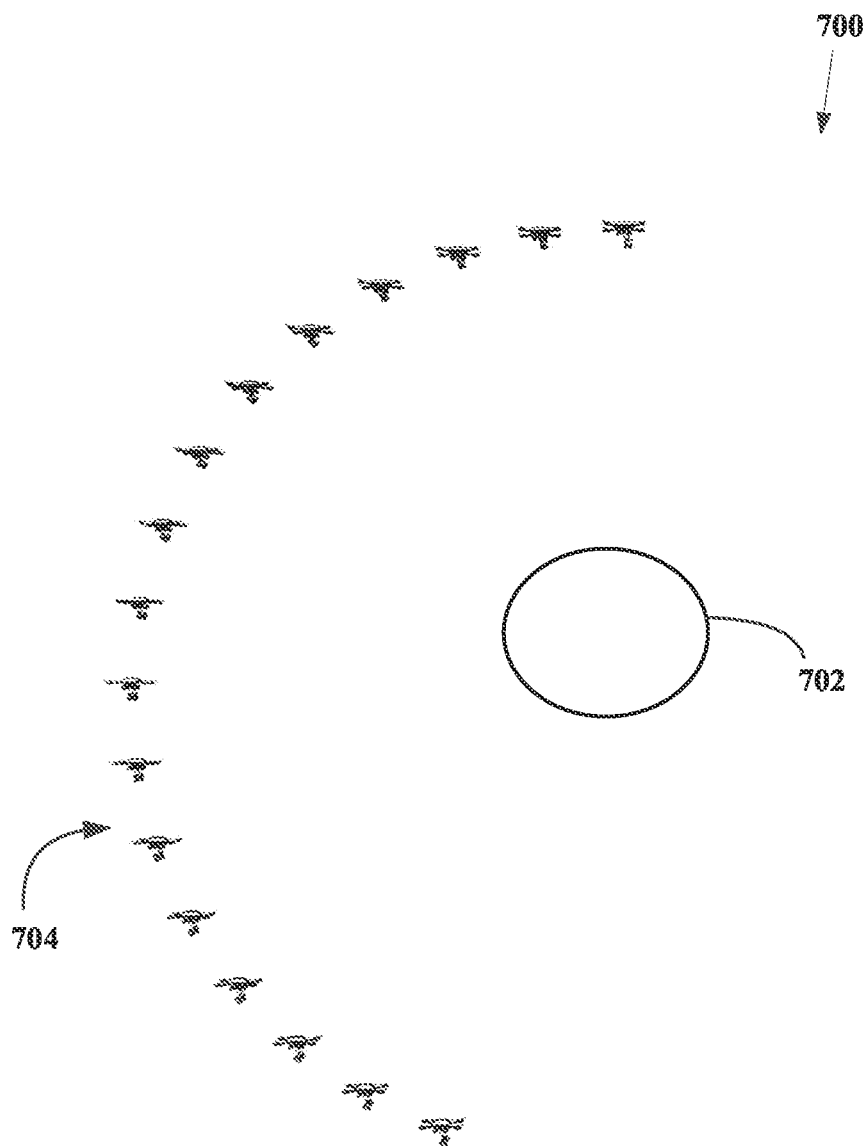
FIG. 7 is an illustration showing a formation of a plurality of vehicles to collect image data of a subject in accordance with an embodiment of the present disclosure.

FIG. 7 is an illustration 700 showing a formation 704 of a plurality of quadrotors to collect image data of a subject 702. As described supra, the plurality of quadrotors 704 receive positioning and imaging instructions from a controller 102. Accordingly, their trajectories are mapped out from their respective current positions to navigate to their respective destinations. Upon reaching their destinations the quadrotors levitate or hover or float in the air over the subject in their respective positions as they execute instructions to collect image data of the subject 702. In an embodiment, the quadrotors are used only for illuminating the subject 702 while the image data is collected by external cameras. In an embodiment, the image data can be collected by cameras located on the quadrotors. Alternately the image data can also be collected by a combination of the quadrotor cameras and the external cameras. Various kinds of image data such as a still image or a video can be collected in accordance with the embodiments disclosed herein.

Figure 8:
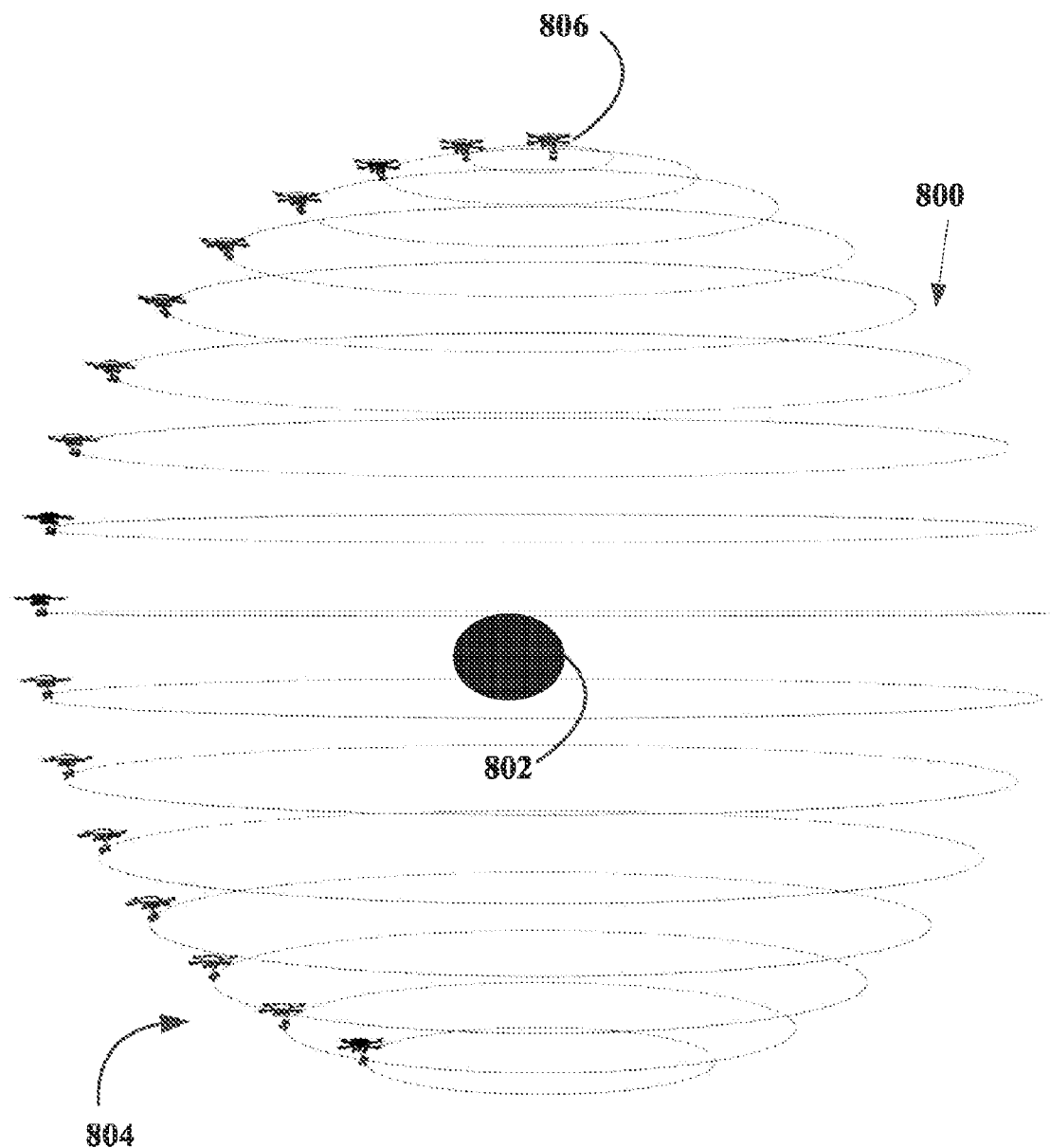
FIG. 8 is an illustration showing a formation of a plurality of vehicles in accordance with an embodiment of the present disclosure.

FIG. 8 is an illustration 800 showing a formation 804 of a plurality of quadrotors around a subject 802 being imaged. All quadrotors expect the quadrotor 806 orbit around the object 802 to create a virtual sphere of quadrotors executing one or more of the tasks including illuminating the object or collecting image data as they move along their respective trajectories. The quadrotor 806 hovers above the object 802 in its position to collect or aid the collection of image data. Thus, a pattern of quadrotors can also be formed wherein some of the quadrotors move in particular trajectories around the subject 802 and some of the quadrotors simply levitate or hover above the subject 802 while image data is being collected.

Figure 9:
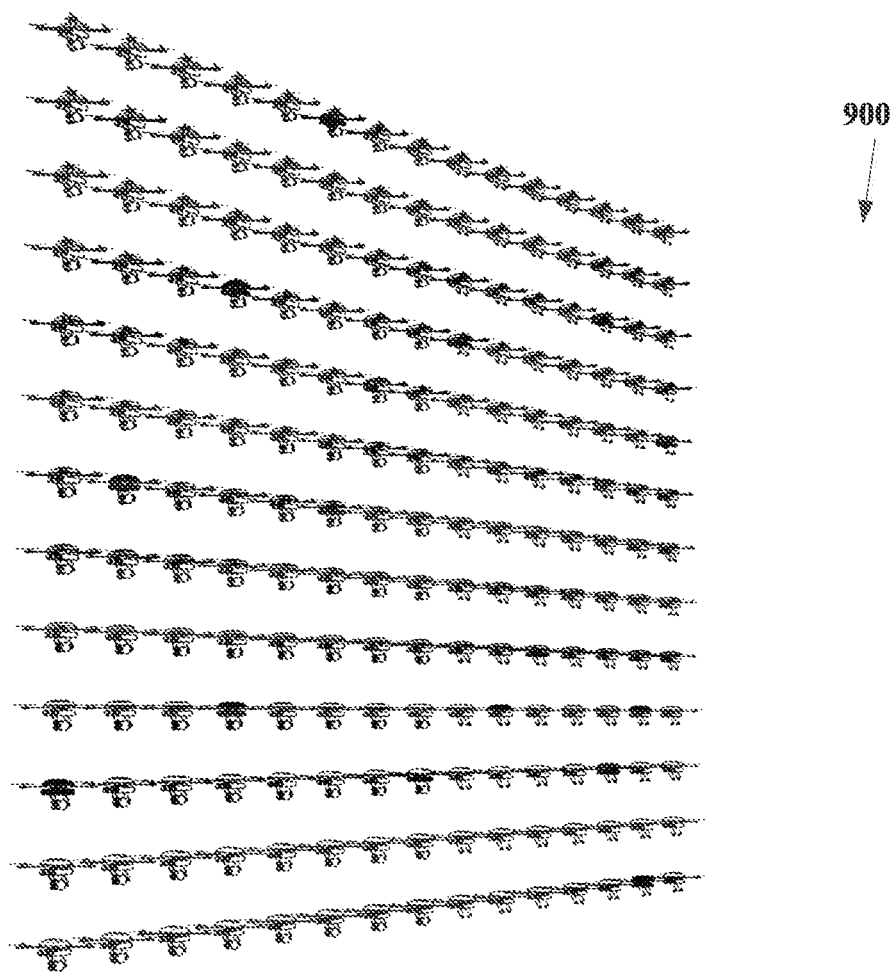
FIG. 9 is an illustration showing a grid pattern formed by a plurality of vehicles in accordance with one embodiment.

FIG. 9 is an illustration showing a grid pattern 900 formed by a plurality of quadrotors in accordance with one embodiment. The subject to be imaged (not shown) can be situated in front of the pattern and may be imaged via cameras on the quadrotors and/or external high speed cameras. the planar grid formation can then be moved so that the plane of the grid formation may be oriented at myriad positions relative to a horizontal or vertical reference plane.

Figure 10A:
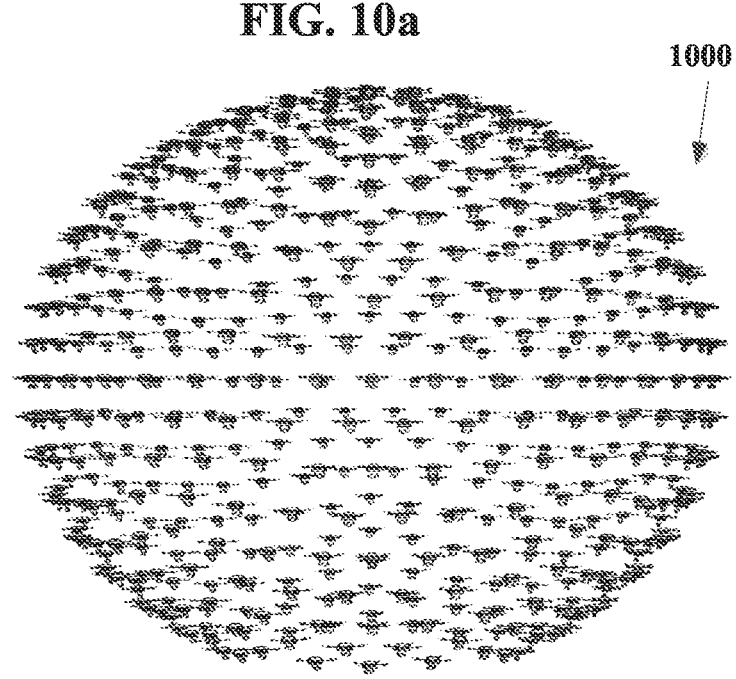
FIG. 10a shows a spherical arrangement of the vehicles in accordance with one embodiment of the present disclosure.

FIG. 10*a* shows a spherical arrangement 1000 of the quadrotors in accordance with one embodiment. The subject (not shown) being imaged can be situated inside the sphere in one embodiment. Thus, the subject can be initially positioned and the plurality of drones arrange themselves in a plurality of substantially evenly distributed circles to form the pattern 1000 around the subject employing one or more reference entities as detailed herein.

Figure 10B:
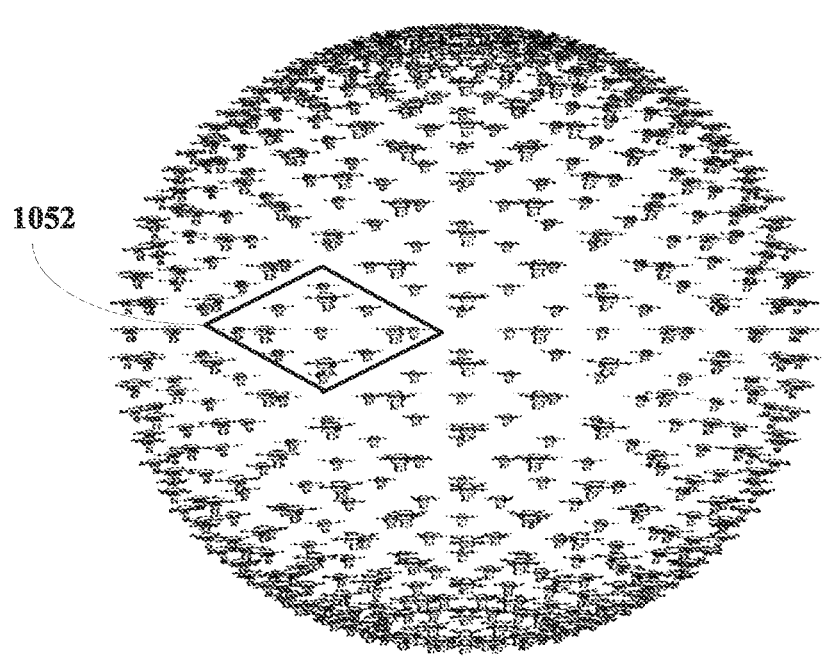
FIG. 10b shows another spherical arrangement of the vehicles in accordance with one embodiment.

FIG. 10*b* shows another spherical arrangement 1050 of the quadrotors in accordance with one embodiment. The subject (not shown) being imaged can be situated inside the sphere. Thus, the subject can be initially positioned and the plurality of drones arrange themselves in a plurality of substantially evenly distributed sub-patterns 1052 to form the pattern 1050 around the subject employing one or more reference entities as detailed herein. Sub-pattern 1052 and arrangement 1000 or 1050 can be changed in multiple combinations of shapes, formations and geometries.

Figure 11:
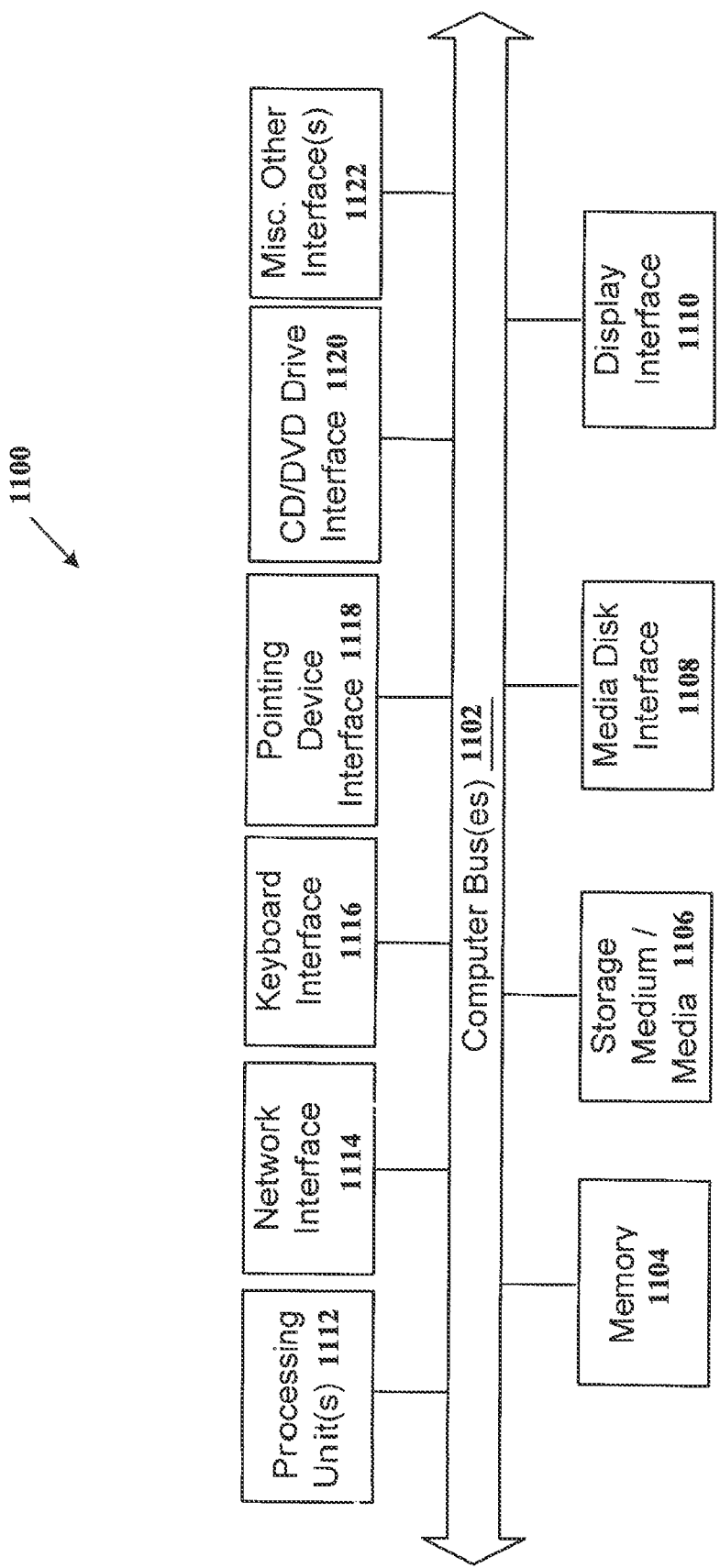
FIG. 11 illustrates internal architecture of a computing device in accordance with one embodiment of the present disclosure.

FIG. 11 illustrates internal architecture of a computing device 1100 in accordance with one embodiment. The internal architecture of the computing device includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, playlists and other files. Persistent storage medium/media 1106 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a processor, information representing a selected pattern comprising a plurality of points, the points representing positions that define a bounded volumetric shape in a three dimensional space, the shape having a subject therewithin;
positioning, by the processor, at least one of a plurality of moveable, controllable, flying vehicles at each of the plurality of points in the selected pattern in the space proximate to the subject, each of the plurality of vehicles comprising a lighting component and at least a selected number of the vehicles comprising an imaging component and being positioned relative to the subject while at the points in the selected pattern;
selectively activating, by the processor, at least one subset of the lighting components of the moveable vehicles at the points of the selected pattern to form a light stage by emitting light, the emitted light illuminating the subject within the shape; and
collecting, by the processor, imaging data from the illuminated subject from imaging components of selected ones of the plurality of moveable vehicles during the emission of light.

2. The method of claim 1, further comprising:
re-positioning, by the processor, the plurality of moveable vehicles to form a second pattern in the space in proximity to the subject; and
activating, by the processor, at least one of the imaging components for collecting imaging data of the subject.

3. The method of claim 1, further comprising:
receiving, by the processor, the collected imaging data from the plurality of moveable vehicles; and
storing, by the processor, the collected imaging data in a non-transitory computer readable storage medium.

4. The method of claim 1, wherein positioning at least one of the plurality of moveable vehicles by the processor further comprises:
transmitting, by the processor, position information associated with the plurality of points to the plurality of moveable vehicles.

5. The method of claim 4, further comprising;
controlling, by the processor, formation of the selected pattern by the plurality of moveable vehicles via communication of control signals.

6. The method of claim 1, further comprising:
receiving, by the processor, imaging requirements for the positions in three dimensional space;
receiving, by the processor, attributes of the plurality of moveable vehicles;
selecting, by the processor, the plurality of moveable vehicles for positioning based on the attributes and the imaging requirements.

7. The method of claim 1, further comprising:
receiving, by the processor, user input related to an imaging process; and
altering, by the processor, the programming of the plurality of moveable vehicles based on the user input.

8. The method of claim 7, altering the programming of the plurality of moveable vehicles further comprises:
altering, by the processor, imaging requirements associated with the plurality of points in the selected pattern in the space.

9. The method of claim 1, wherein at least a subset of the plurality of moveable vehicles comprise at least two imaging components and activating at least one of the imaging components further comprises activating different ones of the at least two imaging components at different time points.

10. The method of claim 1, further comprising:
providing, by the processor, at least the selected pattern for selection based on a shape of the subject.

11. The method of claim 1, further comprising:
automatically selecting, by the processor, the selected pattern for positioning the plurality of moveable vehicles.

12. An apparatus comprising:
a processor;
a storage medium for tangibly storing thereon program logic for execution by the processor, the program logic comprising:
pattern receiving logic, executed by the processor, for receiving information representing a selected pattern comprising a plurality of points, the points representing positions that define a bounded volumetric shape in a three dimensional space, the shape having a subject therewithin;

positioning logic, executed by the processor, for positioning at least one of a plurality of moveable, controllable, flying vehicles at each of the plurality of points in the selected pattern in the space proximate to the subject, each of the plurality of vehicles comprising a lighting component and at least a selected number of the vehicles comprising an imaging component and being positioned relative to the subject while at the points in the selected pattern;

activating logic, executed by the processor, for selectively activating at least one subset of the lighting components of the moveable vehicles at the points of the selected pattern to form a light stage by emitting light, the emitted light illuminating the subject within the shape; and collecting logic for collecting imaging data from the illuminated subject from imaging components of selected ones of the plurality of moveable vehicles at the points of the selected pattern during the emission of light.

13. The apparatus of claim 12, further comprising:
re-positioning logic, executed by the processor, for repositioning the plurality of moveable vehicles to form a second pattern in the space in proximity to the subject; and
activating logic, executed by the processor, for activating at least one of the imaging components for collecting imaging data of the subject.

14. The apparatus of claim 12, wherein the positioning logic further comprises:
transmitting logic, executed by the processor, for transmitting position information associated with the plurality of points to the plurality of moveable vehicles.

15. The apparatus of claim 12, further comprising:
controlling logic, executed by the processor, for controlling formation of the selected pattern by the plurality of moveable vehicles via communication of control signals.

16. The apparatus of claim 12, further comprising:
requirements receiving logic, executed by the processor, for receiving imaging requirements for the positions in three dimensional space;
attributes receiving logic, executed by the processor, for receiving attributes of the plurality of moveable vehicles;
selecting logic, executed by the processor, for selecting the plurality of moveable vehicles for positioning based on the attributes and the imaging requirements.

17. A non-transitory computer readable storage medium, having stored thereon, processor-executable instructions for:
receiving information representing a selected pattern comprising a plurality of points, the points representing positions that define a bounded volumetric shape in a three dimensional space, the shape having a subject therewithin;
positioning at least one of a plurality of moveable, controllable, flying vehicles at each of the plurality of points in the selected pattern in the space proximate to the subject, each of the plurality of vehicles comprising a lighting component and at least a selected number of the vehicles comprising an imaging component and being positioned relative to the subject while at the points in the selected pattern; and
selectively activating at least one subset of the lighting components of the moveable vehicles at the points of the selected pattern to form a light stage by emitting light, the emitted light illuminating the subject within the shape; and
collecting imaging data from the illuminated subject from imaging components of selected ones of the plurality of moveable vehicles during the emission of light.

18. The computer readable storage medium of claim 17 further comprising instructions for:
repositioning the plurality of moveable vehicles to form a second pattern in the space in proximity to the subject; and
activating at least one of the imaging components for collecting imaging data of the subject.

19. The computer readable storage medium of claim 17 further comprising instructions for:
receiving the collected imaging data from the plurality of moveable vehicles; and
storing the collected imaging data in a non-transitory computer readable storage medium.

20. The computer readable storage medium of claim 17 further comprising instructions for:
transmitting position information associated with the plurality of points to the plurality of moveable vehicles.

21. The computer readable storage medium of claim 20 further comprising instructions for:
controlling formation of the selected pattern by the plurality of moveable vehicles via communication of control signals.

22. A imaging system comprising:
a controller comprising a processor and a computer readable storage medium;
a plurality of moveable, controllable, flying vehicles, each of the plurality of vehicles comprises at least one imaging component;
the computer readable storage medium comprising:
pattern receiving logic, executed by the processor, for receiving information representing a selected pattern comprising a plurality of points, the points representing positions that define a bounded volumetric shape in a three dimensional space, the shape having a subject therewithin;
positioning logic, executed by the processor, for positioning at least one of a plurality of moveable, controllable, flying vehicles at each of the plurality of points in the selected pattern in the space proximate to the subject, each of the plurality of vehicles comprising a lighting component and at least a selected number of the vehicles comprising an imaging component and being positioned relative to the subject while at the points in the selected pattern;
activating logic, executed by the processor, for selectively activating at least one subset of the lighting components of the moveable vehicles at the points of the selected pattern to form a light stage by emitting light, the emitted light illuminating the subject within the shape; and
collecting logic for collecting imaging data from the illuminated subject from imaging components of selected ones of the plurality of moveable vehicles at the points of the selected pattern during the emission of light.

23. The imaging system of claim 22, wherein the computer readable storage medium further comprises a plurality of imaging patterns for selection.

24. The imaging system of claim 22, wherein the at least one imaging component is selected from a group of components consisting of a light, an LED (light emitting diode), a camera, an optical sensor, an infrared sensor, a radio sensor and a polarized light source.

25. The imaging system of claim 22, wherein the at least one imaging component is a light field camera.

\* \* \* \* \*